United States Patent [19]

Piller et al.

[11] Patent Number: 4,687,304
[45] Date of Patent: Aug. 18, 1987

[54] INCIDENT ILLUMINATION APPARATUS FOR A MICROSCOPE

[75] Inventors: Horst Piller; Albert Schilling, both of Aalen, Fed. Rep. of Germany

[73] Assignee: Carl-Zeiss-Stiftung, Heidenheim, Fed. Rep. of Germany

[21] Appl. No.: 799,648

[22] Filed: Nov. 19, 1985

[30] Foreign Application Priority Data

Nov. 19, 1984 [DE] Fed. Rep. of Germany ....... 3442218

[51] Int. Cl.[4] ............................................ G02B 21/06
[52] U.S. Cl. .................................................. 350/526
[58] Field of Search ............... 350/511, 513, 524, 525, 350/526, 527, 528

[56] References Cited

U.S. PATENT DOCUMENTS

| 2,146,506 | 2/1939 | Maisch | 350/526 |
| 4,232,937 | 11/1980 | Swaninathan et al. | 350/525 |
| 4,505,555 | 3/1985 | Piller et al. | 350/526 |
| 4,585,315 | 4/1986 | Sincerbox et al. | 350/525 |

Primary Examiner—John K. Corbin
Assistant Examiner—Vincent J. Lemmo
Attorney, Agent, or Firm—Walter Ottesen

[57] ABSTRACT

An illumination apparatus having two separate optical systems each of which is provided with its own light source for the bright-field and the dark-field illumination beam path and which can be optimized independently on one another to meet the different requirements of both types of illumination. The two optical systems are secured to the microscope such that their axes meet at, or in the vicinity of, the bright-field reflector via which the illumination is directed into the observation beam path.

7 Claims, 5 Drawing Figures

INCIDENT ILLUMINATION APPARATUS FOR A MICROSCOPE

FIELD OF THE INVENTION

The invention relates to an incident illumination apparatus for microscopes and includes an arrangement for switching between bright-field illumination and dark-field illumination.

BACKGROUND OF THE INVENTION

Incident illumination apparatus for microscopes are known which have a common light source for bright-field illumination and dark-field illumination and are configured in accordance with one of the following considerations (A) and (B) below.

(A) Where a good quality of the dark-field illumination and a reduced need for complex optical elements are of primary importance, a more or less inadequate bright-field illumination is accepted. Such an inadequate bright-field illumination is associated with non-uniform or incomplete illumination of the object or the pupil. Reduced contrast due to reflected or parasitic light is also a condition of inadequate bright-field illumination.

An illumination apparatus configured according to these considerations is described, for example, in the book by Michel entitled "Die Mikrophotographie", Springerverlag Vienna, 1957, pages 411 and 412. The known apparatus permits rapid switching from bright-field to dark-field illumination by operating a slider by means of which an annular diaphragm with an ancillary lens is introduced into the beam path. However, the optical system used in this illumination apparatus is not suitable for meeting the Köhler illumination requirements. For this purpose, it is necessary to exchange the entire illumination apparatus which requires much time since the exchange involves also adjustment procedures.

(B) Where a correct bright-field illumination is the primary consideration, compliance with the Köhler illumination principle in the bright-field illumination system, that is, the generation of intermediate images, is required. The light source is imaged for a first time through a collector lens into an aperture iris diaphragm, which can be centered, and through one or more lenses together with the aperture diaphragm into the pupil of the objective serving as condenser. At the same time, an intermediate image has to be formed of the collector with aid of ancillary lenses into the illuminating field iris diaphragm which can likewise be centered. The collector is conjugated with respect to the object plane. Combined bright-field and dark-field illumination apparatus configured according to this principle are described, for example, in German published patent application DE-OS No. 2,941,676, German published and examined patent application DE-AS No. 2,021,784, German patent No. 2,331,750, German published patent applications DE-OS No. 2,542,075, DE-OS No. 2,925,407 and DE-OS No. 3,028,418. In all these illumination apparatus, the light source and a major part of the Köhler optical illumination system are utilized jointly for both bright-field and dark-field illumination. This configuration, however, necessitates a considerable structural length, which is not absolutely necessary for a dark-field illumination since controllable illuminating field diaphragms and aperture diaphragms may be dispensed with and since the light source, which should be as large and as homogeneous as possible, may be imaged into the objective.

When combining the two illumination systems in an optical system common to both, the optical lengths of the bright-field and dark-field illumination apparatus must be identical; also, the optical elements common to both systems require relatively wide apertures, although these are not necessary for a bright-field illumination. Consequently, such combined illumination apparatus have a complicated configuration, and are awkward to operate or, if it is desired to facilitate their operation, additional mechanisms for coupling the switching processes on different optical elements are required. As a result, the optical system of neither one of the two types of illumination can be optimized, but has to be considered as a compromise between the contradictory demands made by the two types of illumination on the optical system required for realization.

German patent Nos. 569,884 and 603,324 disclose arrangements for a rapid change between dark-field and bright-field illumination wherein the bright-field reflector is moved in the course of the switching action by means of which the bright-field illumination beam is reflected into the observation beam path. However, these known arrangements, too, are connected downstream of a single optical system used jointly in both dark-field and bright-field illumination. When switching over, only different coaxial partial bundles are masked out of the common beam path. Accordingly, it is not possible in these known arrangements to optimize the bright-field and the dark-field illumination independently of one another.

German published patent applications DE-OS No. 2,301,597, DE-OS No. 3,200,662 and DE-OS No. 1,622,989 disclose incident-light dark-field illumination apparatus which include ring-shaped fiber bundles placed in surrounding relationship to the objective of the microscope. These ring-shaped fiber bundles receive their light from a second supplementary light source. However, such illumination apparatus are invariably tailored to the needs of a specific objective and cannot be simply exchanged. If the microscope used is equipped with a turret and is to be frequently switched between different objectives, such additional apparatus for dark-field illumination are unsuitable.

SUMMARY OF THE INVENTION

It is the object of the invention to provide an illumination apparatus that is capable of being switched between bright-field illumination and dark-field illumination that permits optimum conditions to be adjusted for both types of illumination and provides convenient switching using a minimum of simple switching elements which are easy to operate.

This object is accomplished by providing an illumination apparatus including two separate optical systems for illumination with each system having its own light source. The optical systems are attached to the microscope such that their optical axes meet at, or in the vicinity of, the bright-field reflector by means of which the illumination is reflected into the observation beam path.

This arrangement results in two optical illumination systems which are substantially separate up to the reflector in the incident illuminator and can be optimized for dark-field and bright-field illuminations independently of one another. Advantageously, the switching between the two optical systems can be accomplished by a single movable mirror element arranged at the intersection of the two axes.

The movable mirror element can be a ring mirror which can be switched into position in lieu of the bright-field reflector, with the axes of the two mirrors conjointly defining an angle. This arrangement affords the advantage of permitting the dark-field illumination apparatus to be mounted laterally to the incident illuminator of the microscope, for example. The transfer of control between ring mirror and bright-field reflector has the added advantage that with the dark-field illumination in operation, loss of light is not allowed to occur when the observation beam path is separated from the illumination beam path.

However, it is also possible to mount the switchable mirror element forward of the bright-field reflector when viewed in the direction of light; in this embodiment, the bright-field reflector is surrounded by a ring mirror which is likewise fixed in position.

In at least one of the two optical systems, preferably in the one for dark-field illumination, the end of one light conductor serves as a homogeneous secondary light source having an increased surface. Such a light source is particularly suitable for use in a simplified optical system in which the light source, that is, the exit area of the light conductor, is directly imaged into the object plane.

Further, it is possible to use a light conductor as light source also for the bright-field type of illumination. A Köhler illumination apparatus with a light conductor suitable for this purpose is described, for example, in German published patent application DE-OS No. 3,147,998.

In a preferred embodiment, the two light conductors for dark-field illumination and bright-field illumination, respectively, are then supplied from a separate primary light source mounted in an adjacent lamp housing.

It is further suitable to couple the switching action between bright-field and dark-field illumination with an arrangement for controlling the luminous density of the respective light sources in order to protect the viewer from glare that may occur in the course of the switching action.

Further advantageous embodiments of the invention will become apparent from the subsequent description in conjunction with the drawing as well as from the claims.

BRIEF DESCRIPTION OF THE DRAWING

The invention will now be described with reference to the drawing wherein.

DESCRIPTION OF THE PREFERRED EMBODIMENTS OF THE INVENTION

Figure 1:
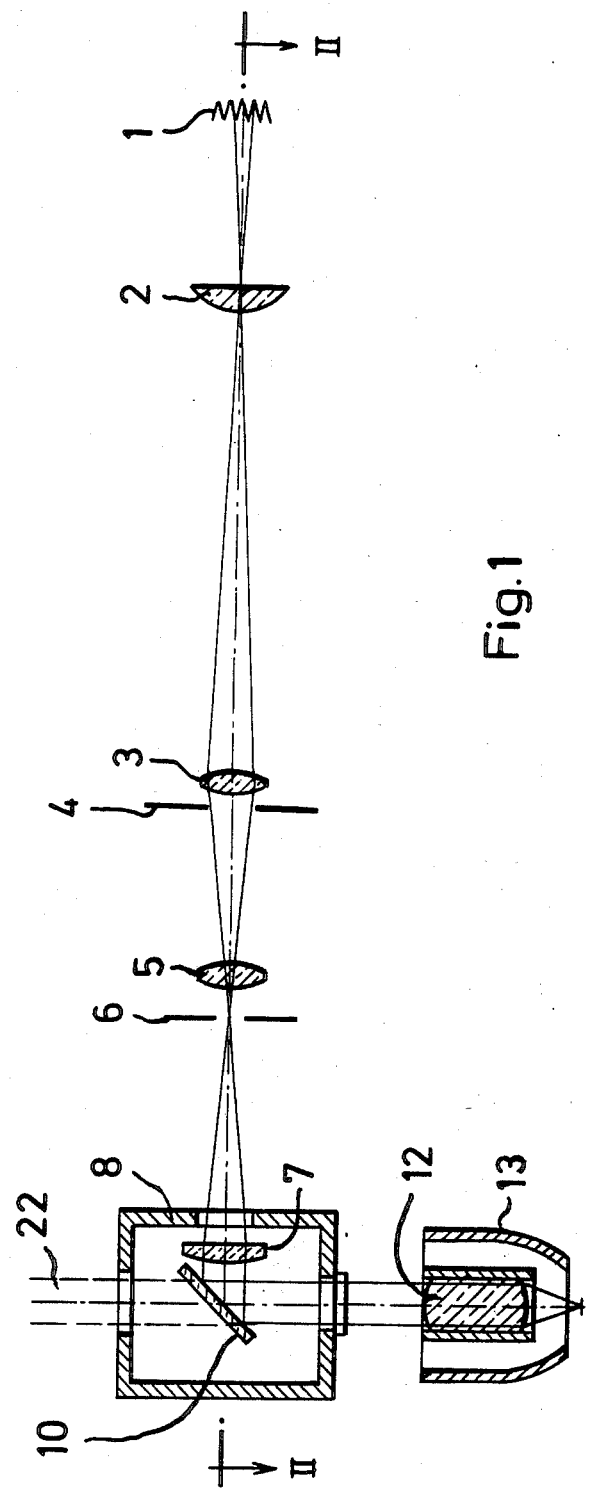
FIG. 1 is a schematic of an incident illumination apparatus of the invention taken along the bright-field beam path at line I—I of FIG. 2 and shown in section.
Figure 2:
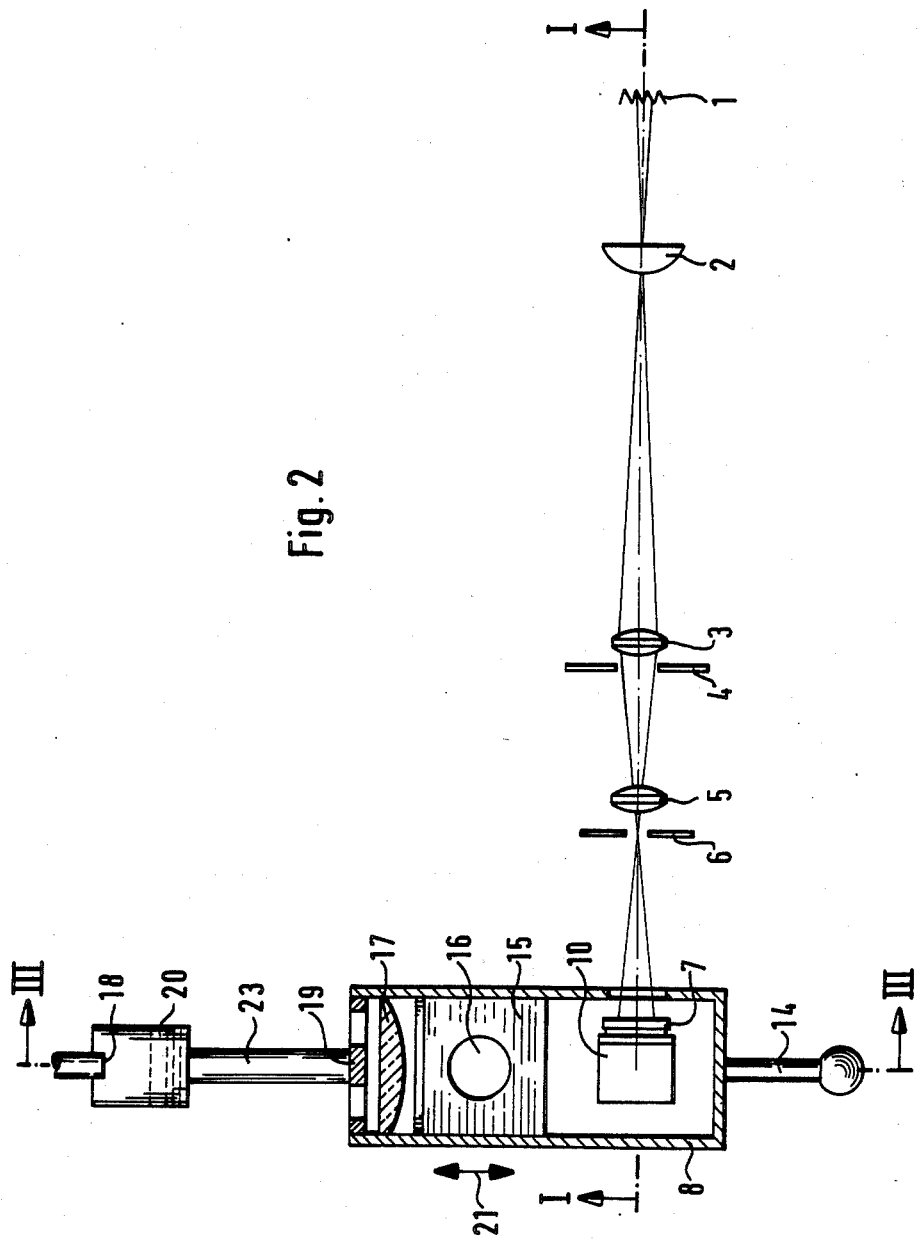
FIG. 2 is another section view of the illumination apparatus of FIG. 1 taken along line II—II thereof.
Figure 3:
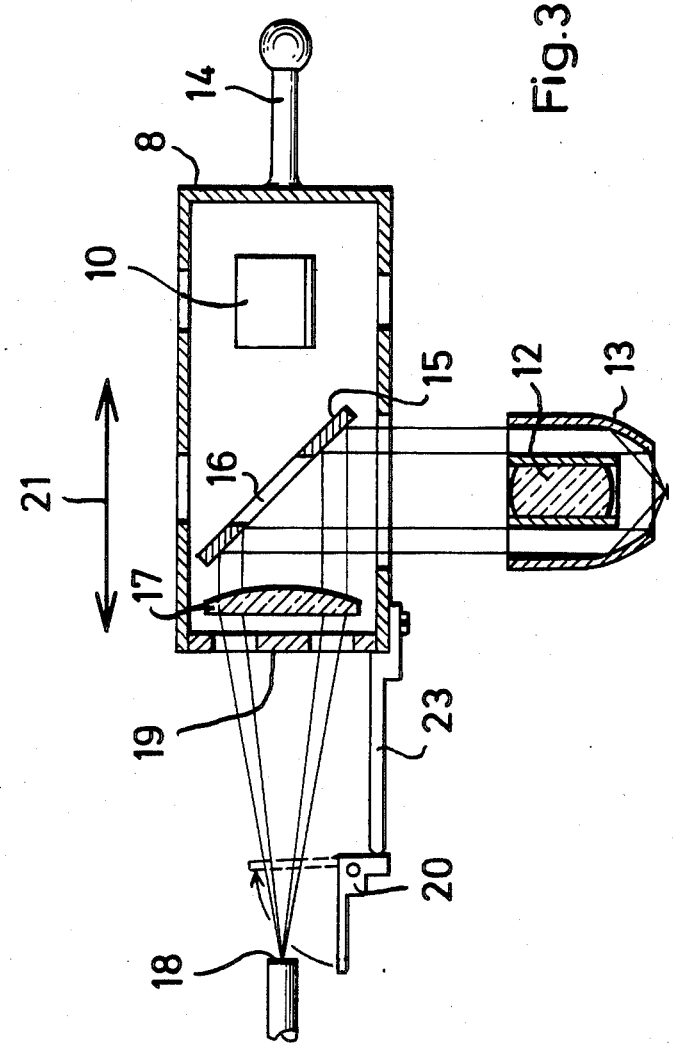
FIG. 3 is a section view of the illumination apparatus of FIGS. 1 and 2 taken along line III—III of FIG. 2 and shows the dark-field beam path.

The combined bright-field and dark-field illumination apparatus for a microscope shown in FIGS. 1 to 3 includes an optical system for bright-field illumination configured according to the Köhler principle and a simplified optical system for dark-field illumination.

The bright-field illumination path is shown in FIG. 1 and the light emanating from an incandescent lamp 1 is collected by a collector lens 2. The collector lens 2 images the light source into the plane of the aperture iris diaphragm 4 in the immediate vicinity of which a field lens 3 is mounted.

An illuminating field diaphragm 6 is mounted behind the aperture iris diaphragm 4 and is likewise configured as an iris diaphragm. A system made up of the field lens 5 in the vicinity of the field diaphragm and of the ancillary lens 7 images the aperture diaphragm 4 into the image-side focal plane of the microscope objective 12 via the bright-field reflector 10. The bright-field reflector 10 is semi-transparent and separates the observation beam path identified by reference numeral 22 from the illumination beam path. Aside from the objective 12, which is at the same time used as bright-field condenser, the optical system necessary for viewing is not shown.

As will be seen from FIG. 2, the bright-field reflector 10 and the ancillary lens 7 are arranged in a housing 8. The housing has a handle 14 for moving it perpendicularly to the optical axes of the illumination and observation beam paths, that is, in the direction of the arrow 21. In addition, the housing 8 accommodates a ring mirror 15 with an elliptical bore 16 as well as a second lens 17. The collector lens 17 and the ring mirror 15 represent elements of the optical system of the dark-field illumination beam path whose function will become apparent from the section view of FIG. 3.

By contrast with FIG. 2, the housing 8 of FIG. 3 is shown as having been displaced into the position "dark field", so that the dark-field ring mirror 15 is above objective 12 instead of the bright-field reflector 10. For dark-field illumination, the end face 18 of a light conductor, which is fastened to the incident illuminator of the microscope, is imaged into the object plane via the lens 17 and the dark-field condenser 13 surrounding the objective 12 in a ring-like manner. The side of the slidable housing 8 facing toward the light conductor 18 is configured as a central diaphragm 19 to suppress scattered light.

A hinged diaphragm 20 is mounted in front of the light conductor 18. When switching from dark-field illumination as shown in FIG. 3 to light-field illumination, a control lever 23 fastened to the slidable housing 8 pivots the diaphragm 20 in front of the light conductor end face 18. This prevents light from the dark-field beam path from impinging upon the objective 12 and its mount when the ring mirror 15 is moved. In this way the viewer is protected from glare.

Figure 4:
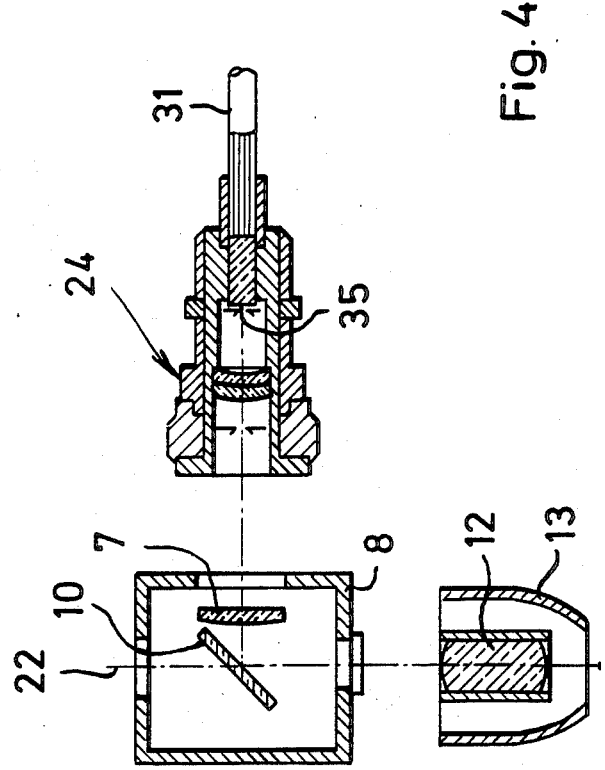
FIG. 4 is a schematic of a modified embodiment of the apparatus of FIG. 1, with a bright-field illumination apparatus using a light conductor; and, FIG. 5 is a section view of a third embodiment of a combined bright-field and dark-field illumination apparatus according to the invention.

FIG. 4 shows a slightly modified embodiment of a combined bright-field and dark-field illumination apparatus. It differs from the apparatus of FIGS. 1 to 3 solely in that it substitutes a compact Köhler illumination apparatus 24 with a light conductor as a secondary light source as described in German published patent application DE-OS No. 3,147,998 for parts 1 to 6 of the bright-field optical system. The light conductor 31 of the bright-field illumination apparatus 25 and the light conductor of the dark-field illumination apparatus, not explicitly shown in FIG. 4, may receive their light from the same primary light source accommodated in a lamp housing installed outside the microscope.

Accordingly, in the embodiments shown in FIGS. 1 to 3 and in FIG. 4, two separate optical systems for bright-field and dark-field illumination are provided. The two optical systems are arranged so that their respective axes are at an angle with respect to each other and so that these axes intersect the axis of the microscope objective, that is, they intersect the axis of the observation beam path, at one point which is at the incident-light reflector itself. The switchover between bright-field and dark-field illumination is accomplished solely by switching the reflectors 10 and 15. The remaining parts of the bright-field and dark-field optical systems such as lenses and diaphragms can be optimized independently of one another regarding their diameter, focal lengths, et cetera for illuminating the object plane as homogeneously as possible.

Figure 5:
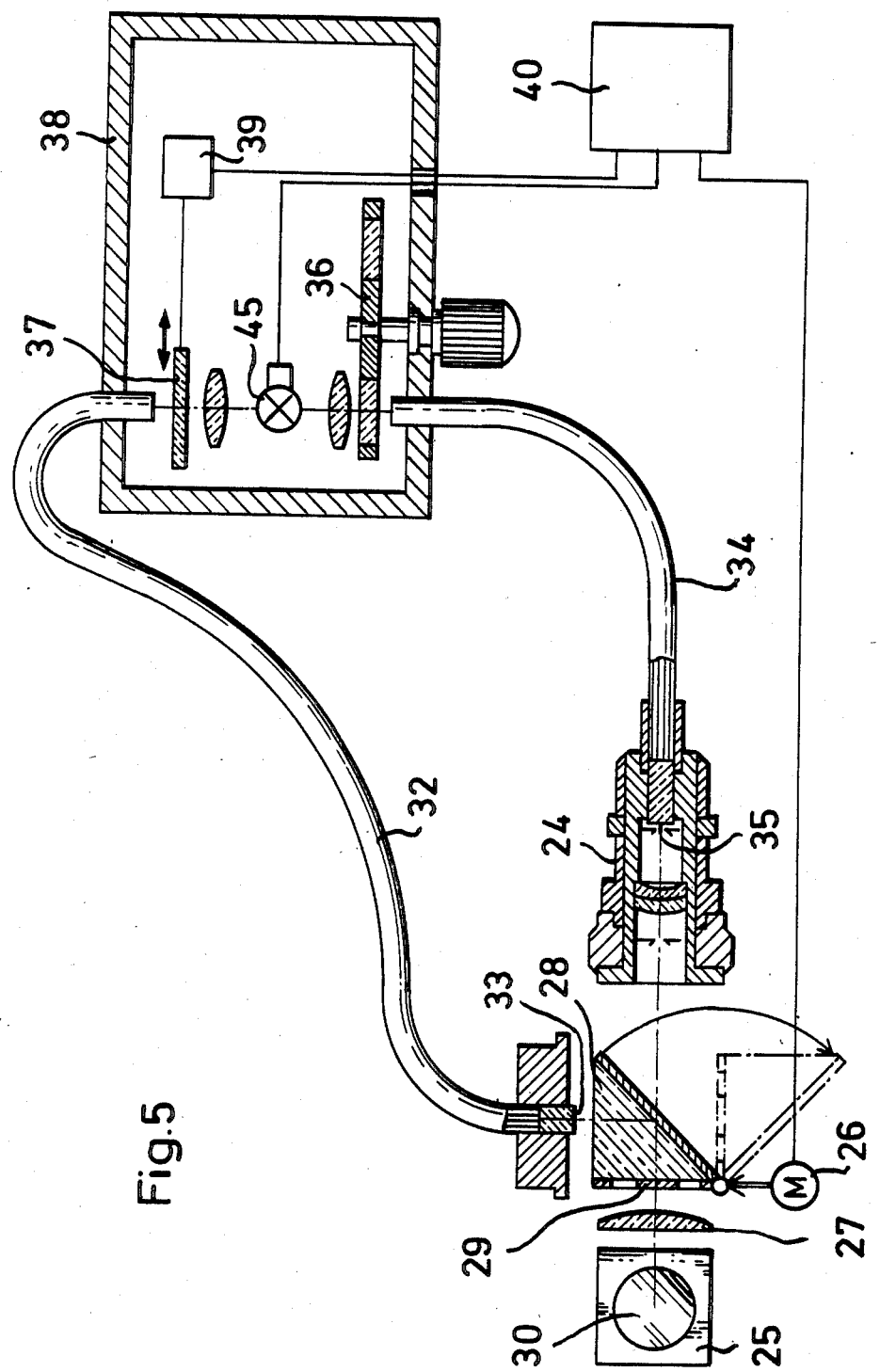

FIG. 5 shows a third embodiment of the invention utilizing two light conductor end faces as secondary light sources for bright-field and dark-field illumination as shown for the embodiment of FIG. 4. Again, the bright-field optical system essentially includes the Köhler illumination apparatus 24 described in German published patent application DE-OS No. 3,147,998, with a light conductor 34 followed by an ancillary lens 27 as well as an oval, semi-transparent beam splitter 30 to reflect the illumination into the observation beam path. In this embodiment, however, the beam splitter 30 is positionally fixed and is surrounded by ring mirror 25 which is likewise fixed in position.

A mirror prism 28 is mounted between the illumination apparatus 24 and the ancillary lens 27. The mirror prism 28 is pivotably actuated by means of a motor 26 and has a central diaphragm 29 on the side thereof facing toward the ancillary lens 27. In the position shown, the prism 28 reflects the light from a second light conductor 32 into the incident illuminator. The end face 33 of the second light conductor 32 is perpendicular to that of the first light conductor 34, which supplies light to the bright-field optical system 24, and serves as the light source for dark-field illumination. The ancillary lens 27 has the function of a collector lens in the dark-field beam path.

Both light conductors 32 and 34 receive their light from a common primary light source 45 in a lamp housing 38 installed adjacent to the microscope.

An electromagnetically actuated diaphragm 37 is arranged between the entry end of the light conductor 32 and the primary light source 45. The operating mechanism 39 for this diaphragm 37 is electrically connected to the same control unit 40 which also controls the motor 26 for pivotally switching the prism 28. In this embodiment, therefore, the switchover to bright-field illumination is accomplished by means of a mirror prism 28 arranged directly in front of the stationary incident-light reflector (25,30) when viewed in the direction of light, with the entry surface of the light conductor 32 being at the same time covered by the diaphragm 37.

A disc filter 36 is mounted ahead of the entry surface of the light conductor 34 and permits adjustment of the intensity or color temperature of the transmitted light. For example, this filter also permits adjustment of the luminous density in the bright-field illumination path, such that the brightness of the object field observed by the viewer is approximately identical for both the bright-field and the dark-field type of illumination and does not change uncomfortably when switching.

Since in dark-field illumination, the viewer always perceives the object as less bright than in bright-field illumination, it is further suitable to adjust the lamp voltage via the control unit 40 in dependence on the particular type of illumination in use. Thus, for example, the lamp is supplied with a higher voltage only for dark-field illumination, which does not appreciably shorten the life of the lamp because this type of illumination generally operates for a shorter period of time.

It is understood that the foregoing description is that of the preferred embodiments of the invention and that various changes and modifications may be made thereto without departing from the spirit and scope of the invention as defined in the appended claims.

What is claimed is:

1. An illumination apparatus for a microscope defining an observation beam path and an object plane disposed in said beam path, the apparatus comprising:
   first optical means for conducting an illuminating bright-field light beam along a first optical axis for a bright-field illumination of an object;
   second optical means for conducting an illuminating dark-field light beam along a second optical axis for a dark-field illumination of an object;
   switching means for switching one of said light beams into said observation beam path and the other one of said light beams out of said observation beam path;
   bright-field reflector means for reflecting at least one of said illuminating light beams into said observation beam path;
   said first optical means and said second optical means being separate optical systems and being disposed relative to the microscope so as to cause said axes to intersect each other in the vicinity of said bright-field reflector means;
   said first optical means including a first light source for supplying said bright-field light beam; and, said second optical means including a second light source for supplying said dark-field light beam; and,
   said switching means including movable mirror means mounted at the point of intersection of said axes for switching between said bright-field illumination and said dark-field illumination.

2. The illumination apparatus of claim 1, said first optical means being a Köhler system including an aperture diaphragm and an illuminating field diaphragm both mounted along said first optical axis; and, said second optical means including lens means for imaging said second light source close to the object plane.

3. The illumination apparatus of claim 1, at least one of said light sources having a light conductor, said light conductor having an end face directed toward said switching means and being configured as a homogeneous secondary light source of increased surface area.

4. The illumination apparatus of claim 3, the other one of said light sources also having a light conductor configured as a secondary light source, said apparatus further comprising a primary light source for supplying both of said secondary light sources.

5. An illumination appartus for a microscope defining an observation beam path and an object plane disposed in said beam path, the apparatus comprising:

first optical means for conducting an illuminating bright-field light beam along a first optical axis for a bright-field illumination of an object;
second optical means for conducting an illuminating dark-field light beam along a second optical axis for a dark-field illumination of an object;
switching means for switching one of said light beams into said observation beam path and the other one of said light beams out of said observation beam path;
bright-field reflector means for reflecting at least one of said illuminating light beams into said observation beam path;
said first optical means and said second optical means being separate optical systems and being disposed relative to the microscope so as to cause said axes to intersect each other in the vicinity of said bright-field reflector means;
said first optical means including a first light source for supplying said bright-field light beam; and, said second optical means including a second light source for supplying said dark-field light beam;
said first optical system and said second optical system being mounted relative to the microscope so as to cause said axes to inersect at said bright-field reflector; and,
said switching means including a movable switching structure for accommodating said bright-field reflector means therein, said switching means further including mirror means mounted in said switching structure, said switching structure being movably mounted for movement between a bright-filed position whereat said bright-field reflector is disposed at the intersection of said axes for reflecting said bright-field beam into said observation beam path and a dark-field position whereat said mirror means reflects said dark-field beam along said observation beam path.

6. An illumination apparatus for a microscope defining an observation beam path and an object plane disposed in said beam path, the apparatus comprising:

first optical means for conducting an illuminating bright-field light beam along a first optical axis for a bright-field illumination of an object;
second optical means for conducting an illuminating dark-field light beam along a second optical axis for a dark-field illumination of an object;
switching means for switching one of said light beams into said observation beam path and the other one of said light beams out of said observation beam path;
bright-field reflector means for reflecting at least one of said illuminating light beams into said observation beam path;
said first optical means and said second optical means being separate optical systems and being disposed relative to the microscope so as to cause said axes to intersect each other in the vicinity of said bright-field reflector means;
said first optical means including a first light source for supplying said bright-field light beam; and, said second optical means including a second light source for supplying said dark-field light beam;
said bright-field reflector means including stationary reflecting means and a stationary ring reflector disposed in surrounding reltionship to said reflecting means; and,
said switching means including mirror means mounted ahead of said bright-field reflector means for movement between a first position whereat said bright-field light beam is directed to said reflecting means and a second position whereat said dark-field light beam is directed to said reflecting means.

7. The illumination apparatus of claim 6, said first light source and said second light source both being secondary light sources, the apparatus comprising a primary light source for supplying said secondary light sources; and, regulating means for regulating the luminous density from said primary light source in response to a switch-over from said bright-field illumination to said dark-field illumination.

* * * * *

UNITED STATES PATENT AND TRADEMARK OFFICE
CERTIFICATE OF CORRECTION

PATENT NO. : 4,687,304
DATED : August 18, 1987
INVENTOR(S) : Horst Piller et al

It is certified that error appears in the above-identified patent and that said Letters Patent is hereby corrected as shown below:

Column 6, line 66, "appartus" should read -- apparatus --.

Column 7, line 25, "inersect" should read -- intersect --.

Column 7, line 32, "bright-filed" should read -- bright-field --.

Column 8, line 25, "reltionship" should read -- relationship --.

Signed and Sealed this

Second Day of February, 1988

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,687,304

DATED : August 18, 1987

INVENTOR(S) : Horst Piller and Albert Schilling

It is certified that error appears in the above-identified patent and that said Letters Patent is hereby corrected as shown below:

On the Title Page, in the Abstract, line 5, delete "on" and insert -- of --.

Column 1, line 50, after the word "with" insert -- the --.

Signed and Sealed this

Seventeenth Day of May, 1988

Attest:

DONALD J. QUIGG

Attesting Officer

Commissioner of Patents and Trademarks